United States Patent Office 3,232,911
Patented Feb. 1, 1966

3,232,911
METHOD FOR PRODUCING β-PROPIO-
LACTONE POLYMERS
Kenichi Fukui and Sachio Yuasa, Sakyo-ku, Kyoto,
Tsutomu Kagiya, Hirakata-shi, Osaka, Takeo Shimizu,
Fushimi-ku, Kyoto, and Takezo Sano, Kishiwada-shi,
Osaka, Japan, assignors to Sumitomo Chemical Company, Ltd., Osaka, Japan, a corporation of Japan
No Drawing. Filed July 30, 1962, Ser. No. 213,144
Claims priority, application Japan, July 31, 1961,
36/27,679
12 Claims. (Cl. 260—78.3)

This invention relates to a method for producing semi-solid, powdery or resinous high polymers by catalytic ring-opening polymerization of β-propiolactone.

Conventionally known catalysts for the ring-opening polymerization of β-propiolactone are acids such as $FeCl_3$, $SnCl_4$ and $H_2SO_4$ and bases such as NaOH and $K_2CO_3$. The β-propiolactone polymer obtained by use of said catalysts softens as low as at 70° to 85° C. Also, it is such a low polymer that has an intrinsic viscosity of less than about 0.1 to 0.2, measured in a chloroform solution at 20° C. and is liquid, greasy or waxy, so that it has little value for practical use.

The present inventors have found, through various researches on catalytic ring-opening polymerization reactions of β-propiolactone, a catalyst capable of producing high polymers having a relatively high softening point and an intrinsic viscosity of 0.1 to 5.0 or of a desired value in a broader range.

An object of the invention is to provide a novel method for the polymerization of β-propiolactone. Another object is to provide such method by use of a catalyst which is easily prepared and handled. Still further object is to provide a novel polymer of β-propiolactone which has a higher intrinsic viscosity than those conventionally obtained. Other objects and advantages will be apparent from the following description.

A distinctive feature of the present invention lies in the capability of producing a high polymer, which has never been obtained by conventional processes. The high polymer obtained in accordance with the present invention has a fiber- or film-forming ability and hence has a markedly high utility as compared with conventional β-propiolactone polymer.

Thus, the present invention provides a method for polymerizing β-propiolactone, which comprises contacting β-propiolactone with a catalyst composed essentially of a member selected from the group consisting of metal phosphates and metal phosphites.

The catalyst composed essentially of a metal phosphate or a metal phosphite, to be employed for the method of the invention, may be selected from various known ones, of which the chemical composition, the physical properties, and the crystalline structure are well studied. In other words, the metal phosphate or phosphite employed in the invention may be any of the metal salts of oxyacids of phosphorus, such as metal salts of ortho, meta, hypo, pyro, polymeta, and other phosphates and phospites. Of course, such metal phosphates involve hydrogenphosphates and hydrogenphosphites in the meaning. In still other words, the metal phosphate or phosphite employed in the invention may be selected from the compounds represented by the general composition formula $H_wM_xPO_y$, wherein M is selected from the group of metals and metal oxide group (oxygen-containing metal radicals), $w$ is a number not lower than 0 but lower than 3, $x$ is a number higher than 0 but not higher than 3, and $y$ is a number not lower than 2.0 but not higher than 4. Concretely speaking, M may be any of those metals belonging to IV to VIII groups in the Periodic Table, or any of the metal oxide group, such as vanadyl (VO), chromyl ($CrO_2$), neptunyl ($NpO_2$), plutonyl (PuO), titanyl (TiO), zirconyl, (ZrO), hafnyl (HfO), and the other oxygen-containing metal radicals.

Typical examples of the phosphates and phosphites include orthophosphates such as $M_{3/m}PO_4$, $M_{2/m}HPO_4$, and $M_{1/m}H_2PO_4$; pyrophosphates such as $M_{4/m}P_2O_7$ and $M_{2/m}H_2P_2O_7$; metaphosphates such as $(M_{1/m}PO_3)_n$, wherein $n$ is a whole number not lower than 2; hypophosphates such as $M_{4/m}P_2O_6$; phosphites such as $M_{2/m}HPO_3$ and $M_{1/m}H_2PO_3$; hypophosphites such as $M_{1/m}H_2PO_2$; tripolyphosphates such as $M_{5/m}P_3O_{10}$; polyphosphates and the like, M representing a metal atom or metal oxide group, and $m$ is a valency of the M.

Besides the phosphates and phosphites as listed above, other compounds prepared by reaction of phosphoric acid, phosphorous acid, a phosphate or a phosphite with a metal compound (such as halide, oxyhalide, oxide, nitrate, sulfate, or the like) may be employed even if their chemical composition or crystalline structure is not obviously known. Such phosphates have often times $w$, $x$, and $y$ which are not exactly whole numbers within the above-identified general composition formula.

For instance, a compound formed, as precipitates, by reaction of a metal halide or a metal oxyhalide with a water-soluble phosphate or phosphite salt in an aqueous medium is separated, washed well with water, dried, calcined if desired, and employed for the method of the invention. Typical examples of such compounds involve phosphate of titanium (composition and structure being not obvious), zirconium pyrophosphate ($ZrP_2O_7$) and others. Or, a compound formed by reaction of a metal oxide with phosphoric acid is employed; typical examples being vanadyl orthophosphate ($VO \cdot PO_4$), zirconyl pyrophosphate $[(ZrO)_2P_2O_7]$, chromium metaphosphate $[(Cr(PO_3)_3]$ and others. Examples of the compounds formed by reaction of a metal nitrate with phosphoric acid or a phosphate include phosphates of manganese ($Mn_2P_2O_7$), thorium ($ThP_2O_7$), uranium $[(UO_2)_2P_2O_7]$, and others. Examples of the compounds formed by reaction of a metal sulfate with a phosphate include phosphate of chromium ($CrPO_4$) and others.

In the metal phosphates and phospihtes employed in the invention, M in the formula, may be single or more than one kind of the metals and metal oxide groups.

Thus, the composition of the catalyst of the invention may vary according to the kind and type of the phosphate and to the condition of the preparation, such as proportion of the amount of reactants. Besides, the crystalline characteristics may vary according to the condition of the calcination. In consequence, the polymerization rates as well as the properties of the polymeric product are varied depending upon the variation of the catalyst used.

There are some cases where said materials contain combined water (or crystalline water). Therefore, these materials are sometimes subjected to heating under reduced pressure or to calcination to eliminate said water content, though they may also be employed as they are. The calcination may be carried out either in air or in the streams of hydrogen, nitrogen or carbon dioxide. In some cases, said metal phosphates are employed in combination with metal hydrides or organometallic compounds of metals of Na, Mg, Cd, Zn, B and Al. In these cases, there is such an advantage that the polymerization reaction velocity is increased as compared with the cases where an organometallic compound is employed alone. In case an organometallic compound is employed in combination, the composition ratio may preferably be 0.1 to 20 mols per mol of the metal phosphate used.

The β-propiolactone monomer can be synthesized by conventional processes, for example, by reaction of ketene with formaldehyde. The monomer to be employed in polymerization may desirably be freed from impurities as far as possible. The purification may be effected with ease by repeated distillations. It is readily inferable that, by use of the catalyst of the present invention, β-lactones other than -propiolactone are also polymerizable. In fact, β-butyrolactone and α,α-diphenyl-β-propiolactone are polymerized to give polymers in considerably favorable yields.

Polymerization reactions by use of the catalysts of the present invention may, of course, be carried out in the absence of solvent, but may be conducted in the presence of a solvent. As the solvent, those in a wide range are available, such as hydrocarbons, ethers, and halogenated hydrocarbons which are inert to the reaction, for example, heptane, benzene, toluene, ethyl ether, chloroform, chlorobenzene and acetonitrile. The polymerization temperature may preferably be in the range of from −80° to 150° C., and desirably be approximately from −20° to 80° C. Since the melting point of β-propiolactone is −33.4° C., it is advantageous to employ a solvent having low melting point among the aforesaid solvents, in case the reaction is effected at a temperature lower than said melting point.

It was confirmed that the reaction proceeds successively. Therefore, in order to obtain a high polymer, it is desirable to carry out the reaction for sufficiently long period of time. The higher the reaction temperature, the faster the polymerization progresses but the lower becomes the intrinsic-viscosity of the resulting polymer. For the production of a polymer having an intrinsic viscosity more than 1, it is desirable to effect the reaction for more than 5 days at normal temperature.

The product obtained in such a manner as described above is soluble in halogenated hydrocarbon, chloroform, dimethyl-formamide or formic acid, but the catalyst employed remains undissolved. Hence, the catalyst is readily separated by filtration or by centrifugation. The separated catalyst is reusable after being washed and dried. From the resulting solution of high polymer, the polymer is reprecipitated by use of a non-solvent, such as methanol or ether.

The high polymer thus obtained is a white powder or a resinous solid having a melting point of 70° to 100° C. It was found by X-ray diffraction that said polymer is highly crystalline. Also, a polymer having high polymerization degree (e.g., having an intrinsic viscosity of more than 0.8) can easily form a tough thin film by being dissolved in a solvent, flowed onto a plate and evaporated for removal of the solvent from said solution. The film-forming ability of said polymer is favorable as compared with that of other polymers, and an extremely thin film can be formed by use of a dilute solution. The resulting film is tough and capable of being cold-drawn, though it is soft. An X-ray diffraction photograph of the stretched film gives a clear fiber diagram and shows a favorable orientation in the direction of the fiber axis. Therefore, the polymer has a wide use as film materials such as coating films and dialysis films, particularly as binders in coating composition. Further, said film has a high mechanical strength, especially proper elongation and high tensile strength, and its electric properties are also favorable. Moreover, due to its high stability, said film is hardly affected by lapse of time and does not become fragile, even when no stabilizer has been incorporated therein. In addition, its water repellency is so favorable that it is also usable as a semipermeable membrane.

On the other hand, polymers of β-propiolactone obtained by conventional processes cannot form films in most cases, due to their low intrinsic viscosities and low molecular weights. Further, even if films are happened to be formed, they are too weak to be employed for practical use.

Such polymer as obtained in accordance with the method of the present invention has never been produced before, and hence the present invention provides a novel high polymer material having excellent film-forming ability.

The method of the present invention is also utilizable in the copolymerization of β-propiolactone with other β-lactones. As other monomers, there are α-methyl-, β-methyl-, β-ethyl-, α,α-dimethyl- and β,β-dimethyl-β-propiolactones. Moreover, the polymers of the present invention are copolymerizable with monomers other than lactones, such as aldehydes and alkylene oxides.

Now, the invention is further described with reference to the examples, which are, however, set forth merely by way of illustration and not by way of limitation.

*Example 1*

A solution of titanium tetrachloride in a dilute hydrochloric acid was mixed with the equimolar amount of an aqueous phoshoric acid solution to obtain a titanium phosphate (having a composition similar to $2TiO_2P_2O_5$). After being calcined for 2 to 5 hours at 300° C., 0.1 g. of said titanium phosphate was charged in a glass ampoule (12 mm. x 100 mm.), to which 2 g. of a purified β-propiolactone monomer was added. After being sealed, said ampoule was immersed in a water bath at 30° C. 5 days later, said mixture solidified completely after showing a induction period. The resulting white powdery material was readily dissolved in chloroform. Insoluble catalyst residue was removed by centrifugation and the concentrated chloroform solution was injected through a capillary tube in a large amount of methanol, whereby a polymer deposited in the form of an extremely fine fiber. The yield was 1.9 g. The intrinsic viscosity thereof measured in chloroform at 35° C. was 2.1. This polymer had a high film-forming ability and was capable of readily forming a tough thin film. As the result of measurement of infrared spectrum of a sample of said film, it was confirmed that said film is a β-propiolactone polymer having a polyester structure. Also, by X-ray diffraction, the polymer was found to be highly crystalline. Further, the film could be cold-drawn and the X-ray diffraction photograph of the stretched film gave a clear fiber diagram.

*Example 2*

The titanium phosphate prepared in Example 1 was employed as a catalyst and tests were effected by varying the amount of said catalyst with sufficiently long period of time. The respective polymerizations were carried out in the same manner as in Example 1 by use of 1.14 g. of β-propiolactone monomer. The experimental results were as follows:

| Amount of catalyst (g.) | Yield (g.) | Polymerization time (days) | $[\eta]$ |
| --- | --- | --- | --- |
| 0.002 | 0.33 | 115 | 3.28 |
| 0.01 | 0.83 | 37 | 3.59 |
| 0.05 | 0.96 | 37 | 1.97 |

As evident from the above table, the longer the polymerization time with the smaller amount of catalyst, the higher the polymerization degree of the resulting polymer.

*Example 3*

0.01 g. of the titanium phosphate prepared in Example 1 and 0.01 g. of $LiAlH_4$ were charged in a glass ampoule under a nitrogen stream. The ampoule was further charged with 0.57 g. of β-propiolactone, sealed, and allowed to stand for 14 days at room temperature (25°–30° C.). The resulting material was treated in the same manner as in Example 1 to obtain 0.50 g. of a solid fibrous polymer. The intrinsic viscosity thereof was 0.87.

Example 4

An aqueous zirconium oxychloride (ZrOCl$_2$) solution was mixed and reacted with an aqueous ammonium phosphate (NH$_4$HPO$_4$) solution to prepare a zirconium phosphate. The resulting precipitate was thoroughly washed with water, dried at 100° C. for 10 hours, and calcined at 300° C. for 5 hours. 0.1 g. of the thus obtained zirconium phosphate was charged in a glass ampoule under a nitrogen current. After the addition of 2.28 g. of β-propiolactone, the ampoule was sealed and allowed to stand in a thermotank at 30° C. to polymerize the mixture. 30 days later, all the reaction product was taken out of the ampoule and treated in the same manner as in Example 1 to obtain 1.22 g. of a solid polymer. The intrinsic viscosity of said polymer was 0.85.

Example 5

A commercially available lead phosphate was calcined at 300° C. for 5 hours. Employing 0.01 g. of the calcined lead phosphate as a catalyst, 0.57 g. of β-propiolactone was charged in a glass ampoule and allowed to stand at room temperature (25°–30° C.) to be polymerized. After 95 days, all the reaction product was taken out of the ampoule and treated in the same manner as in Example 1 to obtain 0.47 g. of a solid polymer. The intrinsic viscosity of said polymer was 2.5.

Example 6

To a vanadium pentoxide, phosphoric acid was added in an amount twice as much the theoretical amount. The resulting mixture was thoroughly mixed, allowed to stand for several days and then washed with methanol to wash off an excess of the phosphoric acid. Subsequently the mixture was dried under reduced pressure to obtain a vanadium phosphate (having a composition similar to V$_2$O$_5$·P$_2$O$_5$). The thus obtained vanadium phosphate was calcined at 300° C. for 5 hours before use. Employing 0.1 g. of said vanadium phosphate, a polymerization was carried out in the same manner as in Example 1. The product grew in the form of a gelled mass to reach half as much the total amount after 5 days. Yield was 0.8 g. The polymer produced was partially soluble in chloroform and soluble in formic acid.

What we claim is:

1. A process for polymerizing a β-lactone selected from the group consisting of β-propiolactone, β-butyrolactone, a,a-diphenyl-propiolactone, and mixtures thereof comprising polymerizing the β-lactone in the presence of a catalyst selected from the group consisting of phosphates and phosphites of metals selected from Groups IV, VB, VIB and VIIB of the Mendeléeff Periodic Table; at a reaction temperature between about −20° to about 80° C.; for a period of time sufficient to produce a polymer having an intrinsic voscosity of at least about 0.8 measured in chloroform at 35° C.

2. A method for polymerization β-propiolactone which comprises contacting β-propiolactone with a catalyst composed essentially of a member selected from the group consisting of metal phosphates and metal phosphites, the metal being selected from Groups IV, VB, VIB, and VIIB of the Mendeléef Periodic Table for a period of time sufficient to produce a polymer having an intrinsic viscosity of at least about 0.1 measured in chloroform at 35° C.

3. A method for polymerizing β-propiolactone which comprises contacting β-propiolactone with a catalyst composed essentially of a metal salt of oxyacids of phosphorus, the metal being selected from Groups IV, VB, VIB and VIIB of the Mendeléeff Periodic Table.

4. A method according to claim 2, wherein the metal is titanium.

5. A method according to claim 2, wherein the metal is lead.

6. A method according to claim 2, wherein the metal is zirconium.

7. A method according to claim 2, wherein the metal is vanadium.

8. A method according to claim 2, wherein the metal is chromium.

9. A method according to claim 2, wherein the metal is manganese.

10. A method according to claim 2, wherein the reaction is carried out at a temperature of −80° C. to 150° C.

11. A method according to the claim 2 wherein the catalyst employed is preliminarily calcined.

12. A method according to claim 2, wherein the catalyst is employed in combination with a member selected from the group consisting of metal hydrides and organometallic compounds.

References Cited by the Examiner

UNITED STATES PATENTS

| | | | |
|---|---|---|---|
| 2,361,036 | 10/1944 | Kung | 260—78.3 |
| 2,449,987 | 9/1948 | Gresham | 260—78.3 |
| 3,021,310 | 2/1962 | Cox et al. | 260—78.3 |
| 3,021,312 | 2/1962 | Cox et al. | 260—78.3 |
| 3,021,316 | 2/1962 | Cox et al. | 260—78.3 |
| 3,111,469 | 11/1963 | Marans | 260—78.3 |

JOSEPH L. SCHOFER, *Primary Examiner.*

DONALD E. CZAJA, *Examiner.*

L. WOLF, *Assistant Examiner.*